United States Patent [19]
Shellenberger

[11] Patent Number: 5,347,980
[45] Date of Patent: Sep. 20, 1994

[54] DUAL DRAINAGE SLOPE RECUPERATIVE HEAT EXCHANGER ASSEMBLY FOR FUEL-FIRED CONDENSING FURNACES

[75] Inventor: Timothy J. Shellenberger, Fort Smith, Ark.

[73] Assignee: Rheem Manufacturing Company, New York, N.Y.

[21] Appl. No.: 190,917

[22] Filed: Feb. 3, 1994

[51] Int. Cl.$^5$ .............................................. F24H 3/02
[52] U.S. Cl. ......................... 126/110 R; 126/116 R; 165/137; 165/913
[58] Field of Search ............ 126/110 R, 110 D, 99 R, 126/99 A, 116 R, 109, 110 B; 237/55, 53; 165/137, 904, 913

[56] References Cited

U.S. PATENT DOCUMENTS

| | | | |
|---|---|---|---|
| 4,164,210 | 8/1979 | Hollowell | 126/110 R |
| 4,478,158 | 10/1984 | Smith | 110/215 |
| 4,478,206 | 10/1984 | Ahn | 126/99 A |
| 4,515,145 | 5/1985 | Tallman et al. | 126/99 A |
| 4,557,249 | 10/1985 | Sweedyk | 126/110 R |
| 4,561,421 | 12/1985 | Hwang et al. | 126/110 R |
| 4,603,681 | 8/1986 | Clawson | 126/110 R |
| 4,653,466 | 3/1987 | DeHaan et al. | 126/110 R |
| 4,960,102 | 10/1990 | Shellenberger | 126/110 R |
| 5,097,819 | 3/1992 | Talbert et al. | 126/110 R |

Primary Examiner—James C. Yeung
Attorney, Agent, or Firm—Konneker Bush Hitt & Chwang

[57] ABSTRACT

A fuel-fired forced air condensing furnace has installed therein a recuperative heat exchanger assembly with a primary heat exchange section operative, during furnace operation, to transfer sensible combustion gas heat to air being flowed through the furnace, and a secondary heat exchange section operative to transfer latent combustion gas heat to the air. The secondary heat exchange section includes a finned tube heat exchanger structure extending between spaced apart combustion gas inlet and outlet collector boxes. The finned tube heat exchanger structure is canted in two perpendicular directions relative to the collector boxes in a manner such that combustion gas condensate formed in the secondary heat exchange section during furnace operation will drain into the outlet collector box, and outwardly through a condensate outlet fitting therein, with the heat exchanger in either a vertical air flow orientation or a horizontal air flow orientation in which the assembly has been rotated ninety degrees relative to its vertical air flow orientation about a horizontal axis parallel to the separation direction of the inlet and outlet collector boxes.

14 Claims, 4 Drawing Sheets

DUAL DRAINAGE SLOPE RECUPERATIVE HEAT EXCHANGER ASSEMBLY FOR FUEL-FIRED CONDENSING FURNACES

BACKGROUND OF THE INVENTION

The present invention generally relates to fuel-fired forced air heating furnace apparatus and more particularly relates to recuperative heat exchanger apparatus used in condensing furnaces.

With the growing need to improve the overall energy efficiency of fuel-fired forced air heating furnaces, considerable design effort has been directed toward increasing the combustion gas-to-supply air heat transfer capability of their heat exchanger components. Traditionally, fuel-fired forced air heating furnaces have been provided with heat exchangers designed to extract only sensible heat from the combustion gases passing therethrough, and transfer a substantial portion of the extracted sensible heat to the air being forced externally across the heat exchanger.

Because only sensible heat is withdrawn from the combustion gases, no appreciable amount of condensation of the combustion gases occurs within the heat exchanger during furnace operation. This mode of heat transfer is commonly referred to as a "dry" or "non-recuperative" process. The combustion gases exiting the heat exchanger, and discharged to atmosphere through a vent stack, are typically quite hot due to the appreciable amount of latent heat remaining therein. Accordingly, a considerable amount of available combustion gas heat is simply dumped to ambient, and the overall heat transfer efficiency of nonrecuperative heat exchangers is generally limited to about 85%.

To capture otherwise wasted latent combustion gas heat, recuperative or "condensing" type heat exchanger structures have been used in which a secondary or "wet" heat exchanger is connected in series with the primary or dry heat exchanger at its combustion gas discharge end. During furnace operation, the primary heat exchanger performs its usual task of extracting sensible heat from the combustion gas internally traversing it, and the secondary heat exchanger operates to extract primarily latent heat from the combustion gas, thereby considerably lowering the temperature of the combustion gas ultimately discharged into the vent stack. The use of condensing type primary/secondary heat exchangers of this type potentially raises the overall heat exchanger thermal efficiency to about b 95%.

Due to the substantially lowered temperature of combustion gas internally traversing the secondary heat exchange portion of the overall recuperative heat exchanger structure during furnace firing, condensate forms within the secondary heat exchange portion and must be continuously drained away. Typically, the condensate formed in the secondary heat exchange portion is drained away by gravity by mounting the recuperative heat exchanger assembly in the furnace housing in a manner such that in the operatively positioned furnace the secondary heat exchange portion of the heat exchanger assembly slopes downwardly toward a drain fitting installed at the combustion outlet end of the heat exchanger assembly. The drain fitting, in turn, is connected to a suitable condensate drain discharge conduit.

Fuel-fired forced air furnaces are typically manufactured in both vertical air flow configurations (both upflow and downflow) and horizontal air flow configurations to provide installation flexibility for a particular furnace line. Whether a vertical flow furnace or a horizontal flow furnace is needed is dictated primarily by the mechanical equipment space available for installation of the furnace. For example, if the available equipment space is a closet area, a vertical air flow furnace configuration is typically required. If, on the other hand, an attic space is available for concealing the furnace, a horizontal air flow furnace configuration is typically utilized.

In nonrecuperative furnaces (which, as mentioned above, do not generate condensate drainage in their heat exchanger structures during furnace operation) substantially identically configured heat exchangers of the same heating capacity may typically be installed by a given furnace manufacturer in a housing of one of its furnaces regardless of whether the furnace is designed to be operated in a vertical air flow orientation or a horizontal air flow orientation.

This has not been the case, however, in recuperative furnaces requiring condensate drainage from the secondary heat exchange portions of their overall recuperative heat exchanger assemblies. To provide proper condensate drainage for such recuperative heat exchangers it has heretofore been necessary to manufacture the heat exchanger assembly in one configuration for installation in vertical air flow furnaces, and in a different configuration for horizontal air flow furnaces. As will be readily appreciated, this requirement for producing heat exchanger assemblies in different shapes to accommodate both vertical and horizontal furnace installations undesirably tends to increase the overall manufacturing, inventorying and fabrication costs of a given furnace line.

It can be seen from the foregoing that it would be desirable to provide a recuperative heat exchanger assembly having a configuration permitting it to be operatively installed, in a manner permitting gravity drainage of combustion gas condensate therefrom, in either a vertical air flow furnace or a horizontal air flow furnace. It is accordingly an object of the present invention to provide such a recuperative heat exchanger assembly.

SUMMARY OF THE INVENTION

In carrying out principles of the present invention, in accordance with a preferred embodiment thereof, a specially designed recuperative heat exchanger assembly is provided and illustratively incorporated in a fuel-fired forced air condensing furnace. The recuperative heat exchanger includes a primary heat exchange section, representatively a plurality of serpentined metal combustor tubes, and a secondary heat exchange section connected to the combustion gas outlet end of the primary heat exchange section.

Representatively, the secondary heat exchange section includes an inlet collector box structure connected to the outlet of the primary heat exchange section to receive combustion gas therefrom, an outlet collector box structure spaced apart from the inlet collector box structure and having a combustion gas outlet opening and a condensate drain outlet opening therein, and a secondary heat exchange structure interconnected between the inlet and outlet box structures and having a combustion gas passage through which the interiors of the inlet and outlet collector boxes communicate.

As manufactured, the recuperative heat exchanger assembly is positionable in a vertical air flow orientation in which the inlet and outlet collector boxes are horizontally spaced apart, and is rotatable from this orientation ninety degrees about a horizontal axis to a horizontal air flow orientation. The secondary heat exchange structure is preferably a finned tube heat exchanger and is canted relative to the inlet and outlet collector box structures, in two mutually perpendicular directions, in a manner such that when the recuperative heat exchanger assembly is in either of its vertical and horizontal air flow orientations the secondary heat exchange structure slopes downwardly toward the outlet collector box structure.

The secondary heat exchange structure is thus provided with a dual drainage slope that permits the same recuperative heat exchanger assembly to be operatively installed in a furnace having either a vertical or horizontal internal air flow configuration. In either installation orientation of the recuperative heat exchanger assembly combustion gas condensate will drain through the finned tube heat exchanger into the outlet collector box for discharge therefrom via its condensate drain outlet opening.

DETAILED DESCRIPTION

Figure 1:
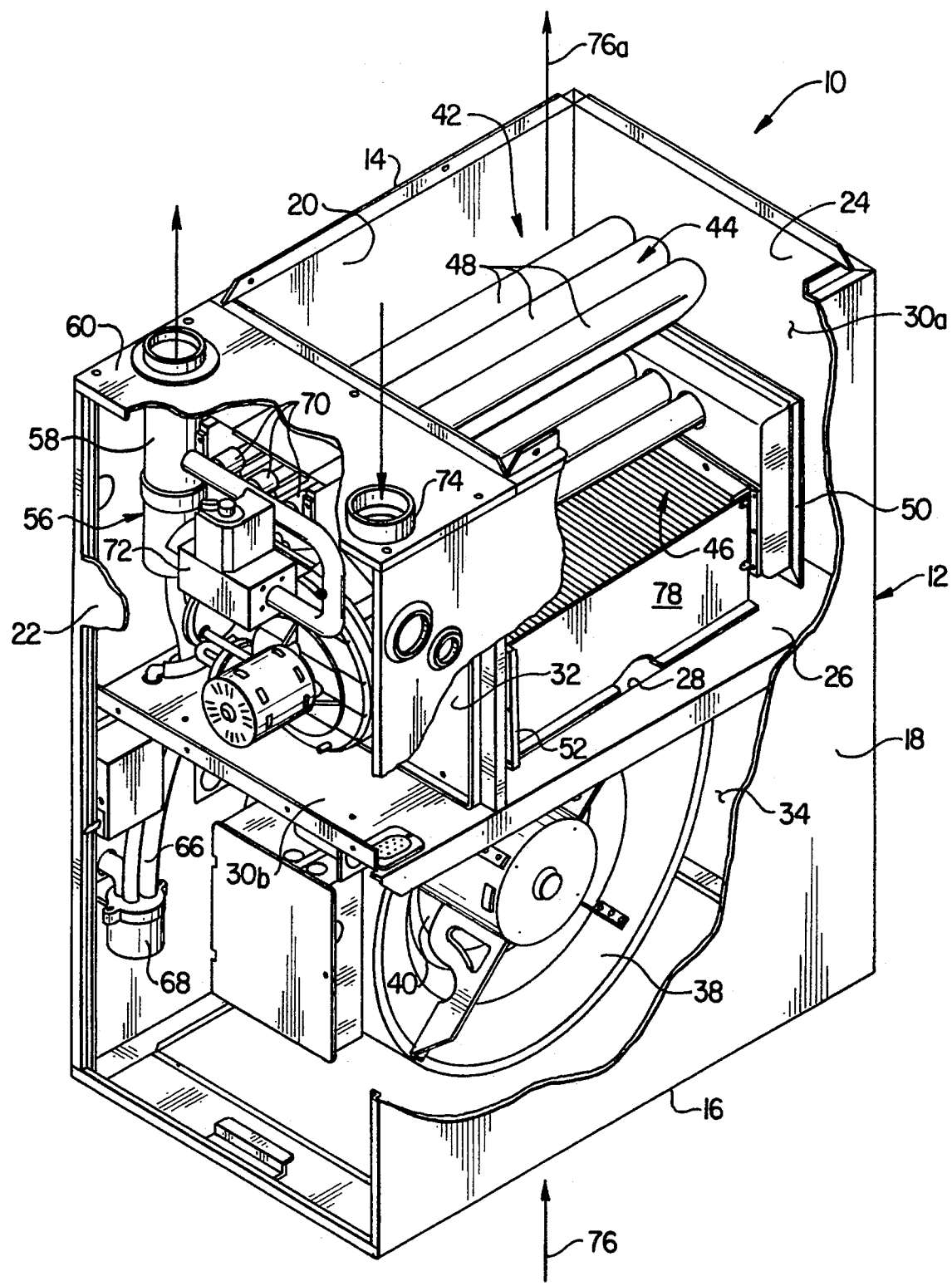
FIG. 1 is a partially cut away perspective view of a fuel-fired vertical flow condensing furnace incorporating therein a specially designed recuperative heat exchanger assembly having a dual drainage slope secondary heat exchange section embodying principles of the present invention.

Illustrated in FIG. 1 is a representative high efficiency fuel-fired condensing furnace 10 which embodies principles of the present invention. Furnace 10 is representatively of an upflow configuration and includes a generally rectangularly cross-sectioned metal jacket or housing 12 having open upper and lower ends 14,16 to which supply and return air ductwork (not shown) may be operatively connected. A horizontal panel 26, having a rectangular opening 28 therein, vertically divides the interior of the housing into an upper chamber 30 divided into subchambers 30a,30b by an interior vertical panel 32, and a lower chamber 34. Subchamber 30a overlies the panel opening 28. The outlet of a supply air blower 38 having an inlet opening 40 is operatively connected to the panel opening 28.

Referring now to FIGS. 1 and 3–6, a specially designed recuperative heat exchanger assembly 42, embodying principles of the present invention, is operatively mounted in the upper subchamber 30a and includes (as best illustrated in FIGS. 3–6) an upper primary section 44 and a lower secondary or condensing section 46 interposed between the section 44 and the horizontal housing panel 26. Primary heat exchanger section 44 is formed from a horizontally spaced plurality of vertically serpentined metal combustor tubes 48 having leftwardly facing open inlet ends 48a connected to the vertical panel 32, and rightwardly facing open outlet ends 48b connected to corresponding inlet openings formed in an inlet collector box 50 positioned in a lower right portion of the upper housing subchamber 30a.

Figure 4:
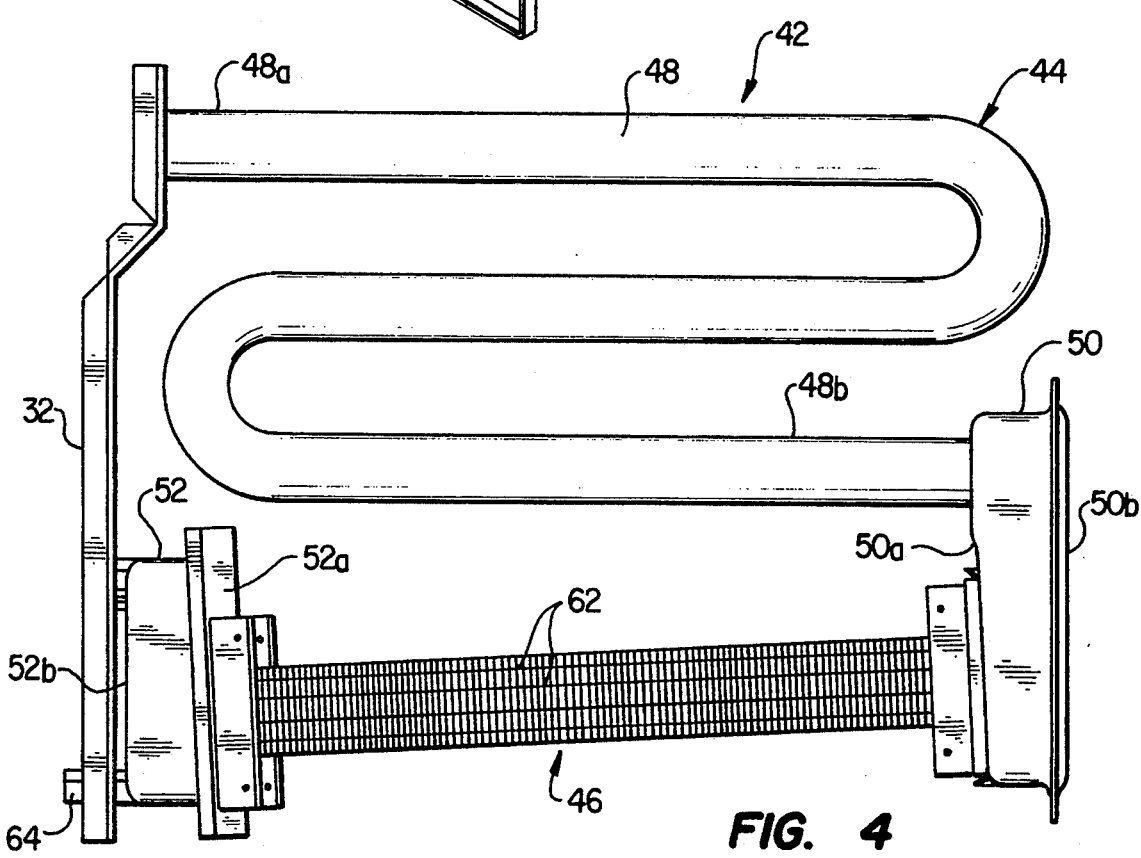
FIG. 4 is a right side elevational view of the heat exchanger assembly in its FIG. 3 orientation.
Figure 5:
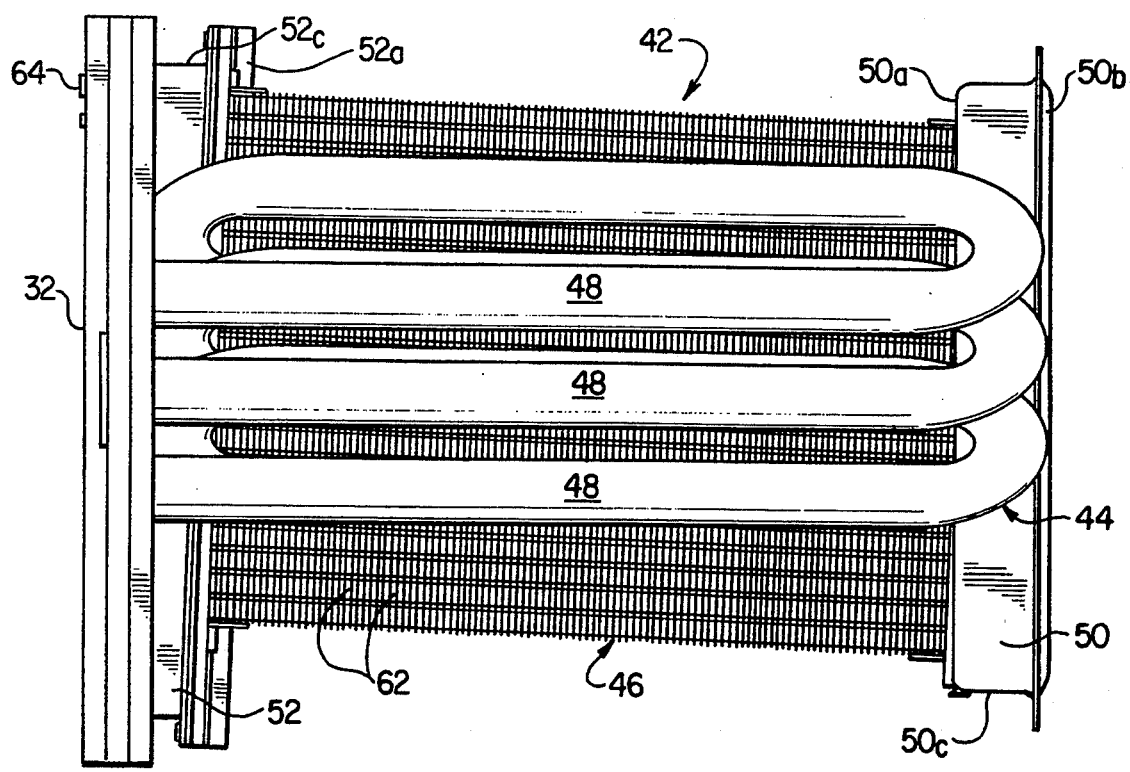
FIG. 5 is a top plan view of the heat exchanger assembly in its vertical air flow configurations as shown in FIGS. 3 and 4.
Figure 6:
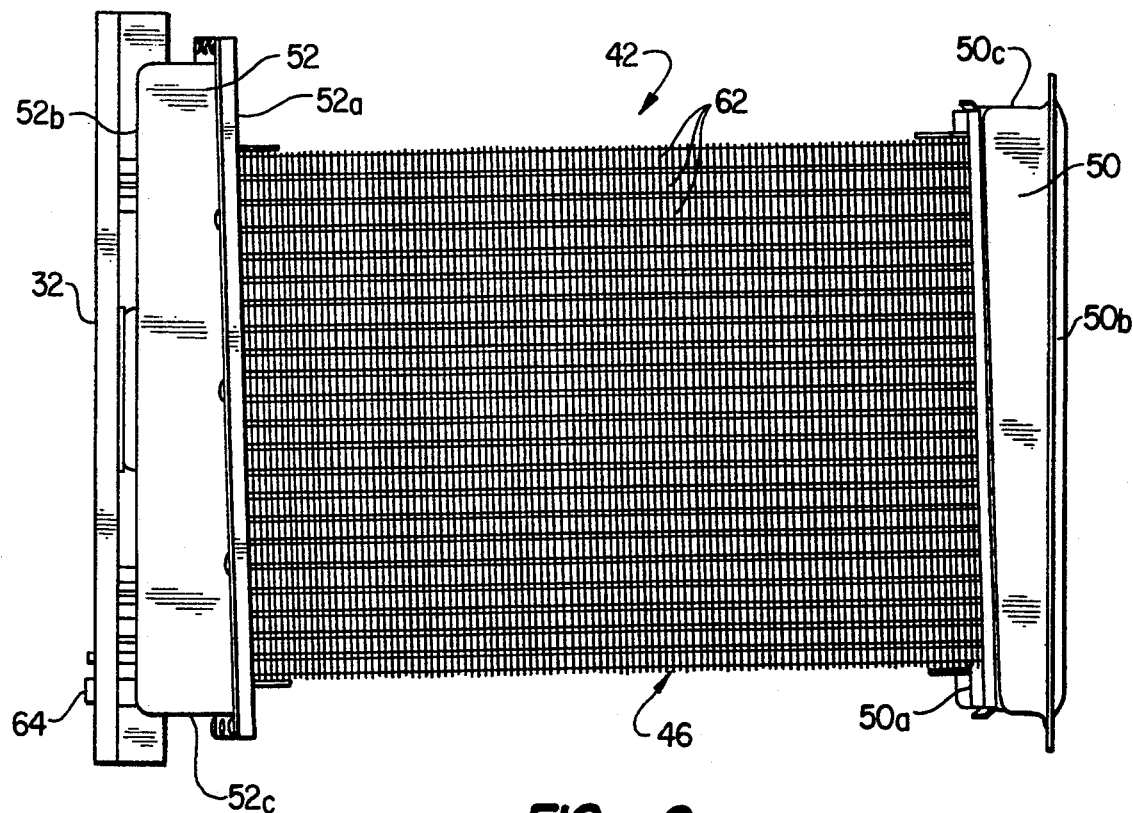
FIG. 6 is a bottom plan view of the heat exchanger assembly in its vertical air flow orientation shown in FIGS. 3 and 4, and is also an enlarged scale side elevational view of the heat exchanger assembly, in its horizontal air flow orientation, taken along line 6—6 of FIG. 2.

Mounted on the vertical panel 32, in a generally horizontally facing relationship with the inlet collector box 50 is an outlet collector box 52 having an outlet 54 connected to the inlet of a draft inducer fan 56 disposed within the upper housing subchamber 30b. Draft inducer fan 56 has an outlet portion 58 extending through a top housing wall portion 60 and connectable to an exterior vent stack (not shown). As best illustrated in FIGS. 4–6, the secondary heat exchanger section 46 includes a spaced series of finned metal heat exchanger tubes 62 having their right or inlet ends connected to the collector box 50, and their left or outlet ends connected to the collector box 52. Collector box 52 is provided with a suitable drain outlet fitting 64 which may be connected to a suitable drain conduit 66, having a drain trap 68 therein, for carrying away condensate generated within the secondary heat exchanger section during furnace operation.

Supported within the upper housing subchamber 30b are a series of inshot-type fuel burners 70 suitably supplied with gaseous fuel through a gas valve 72. As illustrated, the burners 70 are aligned with the open inlet ends 48a of the combustor tubes 48, and are operative during firing of the furnace 10 to flow flames and hot combustion products into the tube inlet ends 48a. A collared intake opening 74 is formed in the top housing wall portion 60 and is connectable to an intake duct (not shown) through which outside combustion air may be supplied to the burners 70 via the interior of the upper housing subchamber 30b during furnace operation.

During operation of the furnace 10 the burners flow flames and resulting hot combustion gas into the open tube ends 48a, with the received combustion gas being drawn sequentially through the serpentined primary combustor tubes 48, the collector box 50, the finned secondary heat exchanger tubes 62, and the collector box 52. Combustion gas entering the draft inducer fan 56 from the collector box 52 is discharged from the fan 56 into the previously mentioned exterior vent stack.

At the same time, the blower 38 draws return air 76 (FIG. 1) from the conditioned space served by the furnace 10 upwardly through the open bottom housing end 16 into the lower housing chamber 34. Air 76 entering the chamber 34 enters the blower inlet 40 and is forced upwardly through the panel opening 28 and then externally across the heat exchanger assembly 42 in an upward direction. As it exteriorly traverses the heat exchanger 42 the air receives sensible and latent combustion gas heat from the heat exchanger assembly and upwardly exits it as heated supply air 76a for delivery to the conditioned space served by the furnace 10. Sheet metal baffle plate members 78 extend along opposite sides of the secondary heat exchanger section 46, between the collector boxes 50 and 52 and upwardly from the horizontal panel 26, and function to preclude any appreciable quantity of air 76 from undesirably bypassing the secondary heat exchanger section 46.

Figure 3:
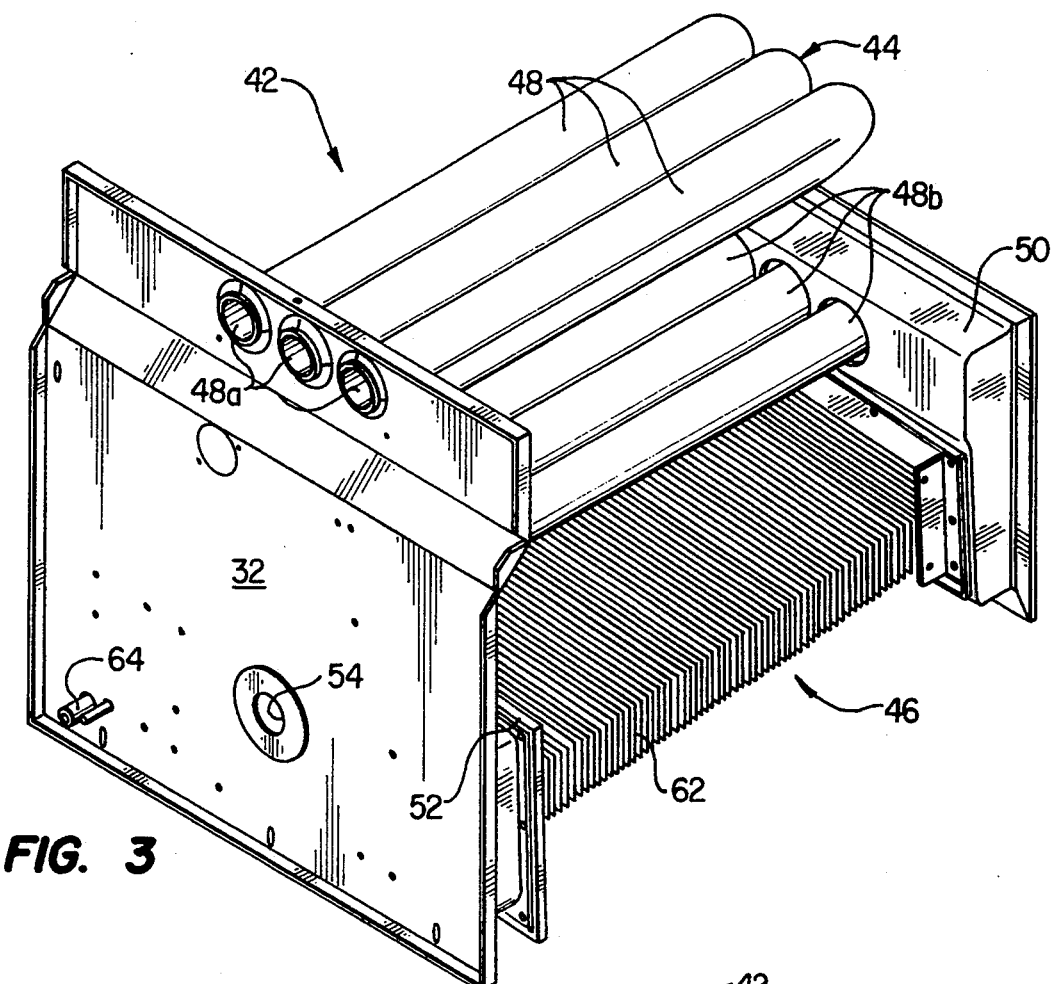
FIG. 3 is an enlarged scale perspective view of the heat exchanger assembly removed from the FIG. 1 furnace and in its vertical air flow orientation.

As best illustrated in FIG. 4, the finned tube portion 62 of the secondary heat exchanger section 46 slopes downwardly toward the outlet collector box 52 when the recuperative heat exchanger assembly 42 is in its vertical air flow orientation depicted in FIGS. 1, 3 and 4. To facilitate the opposite end connections of the finned tube portion 62 to the collector boxes 50 and 52 in a manner causing the finned tube portion 62 to assume this downwardly sloped drainage orientation, the facing inner side wall portions 50a,52a of the collector boxes 50,52 are downwardly and rightwardly sloped (as viewed in FIG. 4) relative to the generally vertical outer side walls 50b,52b of the collector boxes 50,52.

The drain outlet fitting 64 extends outwardly through the vertical panel 32 and is positioned at a lower left corner portion of the outlet collector box 52 as viewed in FIG. 3. Additionally, as viewed in FIG. 4, to provide clearance above the outlet collector box 52 for the lower leg portions of the combustor tubes 48, and to conform to the drainage slope of the finned tube coil portion 62, the inlet collector box 50 is upwardly offset relative to the outlet collector box 52.

Figure 2:
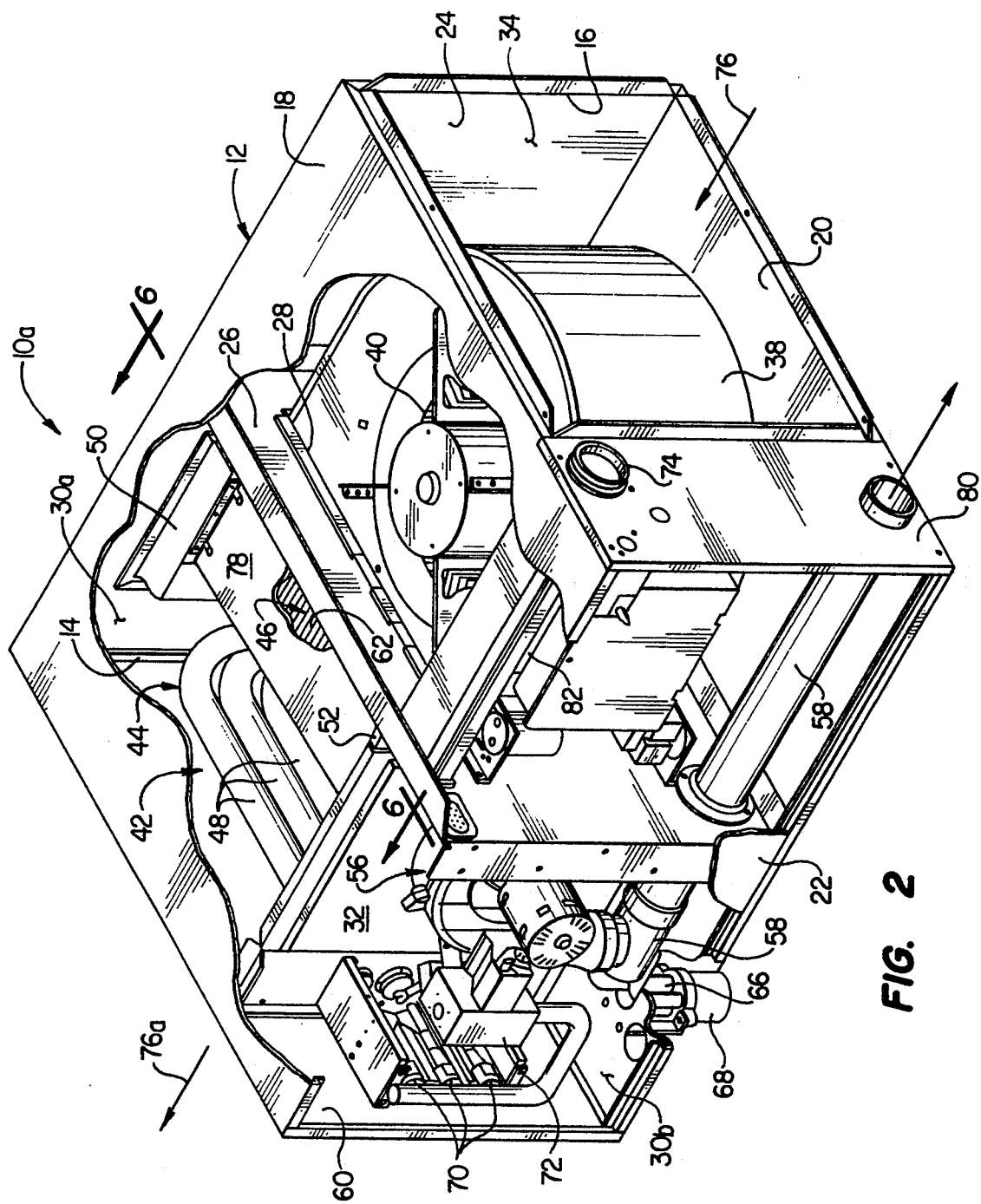
FIG. 2 is a partially cut away perspective view of a fuel-fired horizontal flow condensing furnace in which the recuperative heat exchanger assembly of FIG. 1 has been operatively installed without any configurational modification of the heat exchanger assembly.

In FIG. 2 the previously described recuperative heat exchanger assembly 42, without any configurational modification thereof, is shown operatively installed in a horizontal flow furnace 10a which, with the minor exceptions noted below, is identical in configuration to the previously described vertical flow furnace 10. For ease in comparison between the furnaces 10 and 10a, the components in furnace 10a essentially identical to their counterparts in furnace 10 have been given the same reference numerals. As can be seen by comparing FIGS. 1 and 2, furnace 10a is basically furnace 10 rotated ninety degrees so that the housing wall 20 faces downwardly.

To accommodate the horizontal air flow orientation of the furnace 10a, its drain trap 68 is also rotated ninety degrees and repositioned as indicated, and the drain conduit 66 is similarly repositioned and reoriented as shown. The draft inducer outlet portion 58 (representatively a tubular vent duct) is extended through a widened inlet end wall portion 80 of the housing 12 instead of the opposite housing end wall portion 60. Additionally, the collared combustion air intake opening 74 is moved from the housing end wall portion 60 to the opposite housing end wall portion 80 and communicated with the housing subchamber 30b via an air intake duct 82 extending through the housing chamber 34 and connected to the horizontal panel 26 over an appropriate opening therein.

As typically configured, a conventional recuperative heat exchanger structure useable in one of the furnaces 10,10a could not be used in the other furnace because the secondary heat exchange portion of the overall heat exchanger structure would not be oriented to permit combustion gas condensate to be drained therefrom. Accordingly, two differently configured recuperative heat exchanger structures would have to be manufactured to accommodate furnace housings disposed in vertical and horizontal orientations.

In the present invention, however, the same recuperative heat exchanger assembly 42 may be operatively installed in either of the furnaces 10,10a by virtue of a unique dual drainage slope configuration incorporated in the secondary heat exchange section 46 of the heat exchanger assembly 42. As previously mentioned, with the heat exchanger assembly 42 in its vertical air flow orientation (see FIGS. 1, 3 and 4) the finned tube portion 62 of the secondary heat exchange section 46 is canted in a vertical direction and slopes downwardly toward the outlet collector box 52.

Additionally, as may best be seen in FIG. 5, the finned tube portion 62 is oriented relative to its associated collector boxes 50,52 in a manner such that when the heat exchanger assembly 42 is in its vertical air flow orientation the finned tube portion 62 is horizontally canted from the end 50c of the collector box 50 to the end 52c of the collector box 52 (i.e., canted upwardly and leftwardly as viewed in FIG. 5). This horizontal canting of the finned tube portion 62 is facilitated by a corresponding horizontal sloping of the facing collector box side walls 50a,52a.

Because of this additional canting of the finned tube portion 62, when the heat exchanger assembly 42 is rotated ninety degrees about a horizontal axis from its vertical air flow orientation to its horizontal air flow orientation the finned tube portion 62 slopes downwardly toward the outlet collector box 52 (see FIG. 6) as it also does when the heat exchanger assembly is in its vertical air flow orientation. Additionally, as in the case when the assembly is in its vertical air flow orientation, when the heat exchanger assembly 42 is in its horizontal air flow orientation the drain outlet fitting 64 is disposed on the low side of the outlet collector box 52 to facilitate condensate drainage therefrom.

As can be seen from the foregoing, the unique dual drainage slope built into its secondary heat exchange portion 46 the recuperative heat exchanger assembly 42, without configurational modification thereof, may be installed in either the upflow furnace 10 or the horizontal flow furnace 10a. This advantageously permits a single heat exchanger assembly configuration to be manufactured and installed in either furnace configuration while at the same time automatically assuring proper condensation drainage from the secondary heat exchanger portion during furnace operation.

The foregoing detailed description is to be clearly understood as being given by way of illustration and example only, the spirit and scope of the present invention being limited solely by the appended claims.

What is claimed is:

1. A recuperative heat exchanger assembly operatively mountable in a fuel fired condensing furnace in the path of air flowing therethrough, said recuperative heat exchanger assembly being positionable in a vertical air flow orientation and rotatable therefrom ninety degrees about a horizontal axis to a horizontal air flow orientation, said recuperative heat exchanger assembly comprising:

an inlet collector box structure for receiving hot combustion gas generated by the furnace during operation thereof;

an outlet collector box structure, said outlet collector box structure being spaced apart from said inlet collector box structure in a horizontal direction parallel to said horizontal axis when said recuperative heat exchanger assembly is in said vertical air flow orientation thereof, and having a combustion gas outlet opening and a condensate drain outlet opening therein; and a secondary heat exchange structure interconnected between said inlet and outlet box structures and having a combustion gas passage through which the interiors of said inlet and outlet collector boxes communicate, said secondary heat exchange structure being canted relative to said inlet and outlet collector box structures, in two mutually perpendicular directions, in a manner such that when said recuperative heat exchanger assembly is in either of said vertical and horizontal air flow orientations thereof said secondary heat exchange structure slopes downwardly toward said outlet collector box structure.

2. The recuperative heat exchanger assembly of claim 1 wherein:
said secondary heat exchange portion is a finned tube coil.

3. The recuperative heat exchanger assembly of claim 1 further comprising:
a primary heat exchange structure, secured to said inlet collector box structure, through which combustion gas generated during operation of the furnace may be flowed into said inlet collector box structure.

4. The recuperative heat exchanger assembly of claim 3 wherein:
said primary heat exchange structure includes a plurality of serpentined combustor tubes having open inlet ends, and open outlet ends secured to said inlet collector box structure and communicated with its interior.

5. The recuperative heat exchanger assembly of claim 1 wherein:
said inlet and outlet collector box structures have generally parallel outer side walls, and generally parallel inner side wall portions that are opposite from and sloped relative to said outer side walls, and said secondary heat exchange structure is interconnected between said inner side wall portions.

6. A recuperative heat exchanger assembly operatively mountable in a fuel fired condensing furnace in the path of air flowing therethrough, said recuperative heat exchanger assembly being positionable in a vertical air flow orientation and rotatable therefrom ninety degrees about a horizontal axis to a horizontal air flow orientation, said recuperative heat exchanger assembly comprising:
an inlet collector box structure for receiving hot combustion gas generated by the furnace during operation thereof;
an outlet collector box structure, said outlet collector box structure being spaced apart from said inlet collector box structure in a horizontal direction parallel to said horizontal axis when said recuperative heat exchanger assembly is in said vertical air flow orientation thereof, and having a combustion gas outlet opening and a condensate drain outlet opening therein;
a plurality of serpentined primary heat exchange combustor tubes having open inlet ends, and open outlet ends secured to said inlet collector box structure and communicated with its interior; and
a finned tube secondary heat exchange coil, interconnected between said inlet and outlet box structures, through which the interiors of said inlet and outlet collector boxes communicate, said finned tube secondary heat exchange coil being canted relative to said inlet and outlet collector box structures, in two mutually perpendicular directions, in a manner such that when said recuperative heat exchanger is in either of said vertical and horizontal air flow orientations thereof said finned tube secondary heat exchange coil slopes downwardly toward said outlet collector box structure.

7. The recuperative heat exchanger assembly of claim 6 wherein:
said inlet and outlet collector box structures have generally parallel outer side walls, and generally parallel inner side wall portions that are opposite from and sloped relative to said outer side walls, and said finned tube secondary heat exchange coil is interconnected between said inner side wall portions.

8. A fuel-fired forced air condensing furnace comprising:
a housing having an inlet opening and an outlet opening;
blower means operable to flow air sequentially into said inlet opening, through an air flow path within said housing, and then outwardly through said outlet opening, said air flow path having a portion extending in a first direction through said housing;
burner means for receiving a fuel-air mixture and discharging flames and hot combustion gas;
draft inducer fan means having an inlet and being operative to receive and discharge combustion gas generated during operation of said furnace; and
a recuperative heat exchanger assembly mounted in said housing in said portion of said air flow path and including:
a primary heat exchanger structure internally through which combustion gas discharged from said burner means may be flowed, said primary heat exchanger structure having an open inlet end positioned to receive combustion gas discharged from said burner means, and an open outlet end through which the received combustion gas may be discharged, and
a secondary heat exchanger structure internally through which combustion gas may be flowed, said secondary heat exchanger structure having an inlet end portion fixedly secured to said open outlet end of said primary heat exchanger structure in flow communication therewith, an outlet end portion spaced apart from said inlet end portion and having a combustion gas outlet opening communicated with said draft inducer fan means inlet and a condensate drain outlet opening, and an intermediate portion interconnected between said inlet and outlet end portions, said intermediate portion being canted relative to said inlet and outlet end portions in two mutually perpendicular directions in a manner such that condensate formed in said intermediate portion during operation of said furnace can be drained through said intermediate portion into said outlet end portion whether said first direction is horizontally or vertically oriented.

9. The fuel-fired forced air condensing furnace of claim 8 wherein:
said primary heat exchanger structure is defined by a plurality of serpentined combustor tubes.

10. The fuel-fired forced air condensing furnace of claim 8 wherein:
said inlet end portion of said secondary heat exchanger structure is defined by an inlet collector box structure, said outlet end portion of said secondary heat exchanger structure is defined by an outlet collector box structure, and said intermediate portion of said secondary heat exchanger structure is defined by a finned tube heat exchange coil.

11. The fuel-fired forced air condensing furnace of claim 10 wherein:

said inlet and outlet collector box structures have generally parallel outer side walls and generally parallel inner side wall portions which are sloped relative to said outer side walls, and said finned tube heat exchange coil is interconnected between said inner side wall portions.

12. The fuel-fired forced air condensing furnace of claim 8 wherein:

said furnace is configured for vertical air flow therethrough.

13. The fuel-fired forced air condensing furnace of claim 8 wherein:

said furnace is configured for horizontal air flow therethrough.

14. The fuel-fired forced air condensing furnace of claim 8 wherein:

said secondary heat exchanger structure is interposed between said blower means and said primary heat exchanger structure.

* * * * *